Feb. 19, 1929.                  C. P. BROCKWAY                      1,703,056
                              ELECTRIC POWER SYSTEM
                          Filed Jan. 6, 1921        11 Sheets-Sheet 1
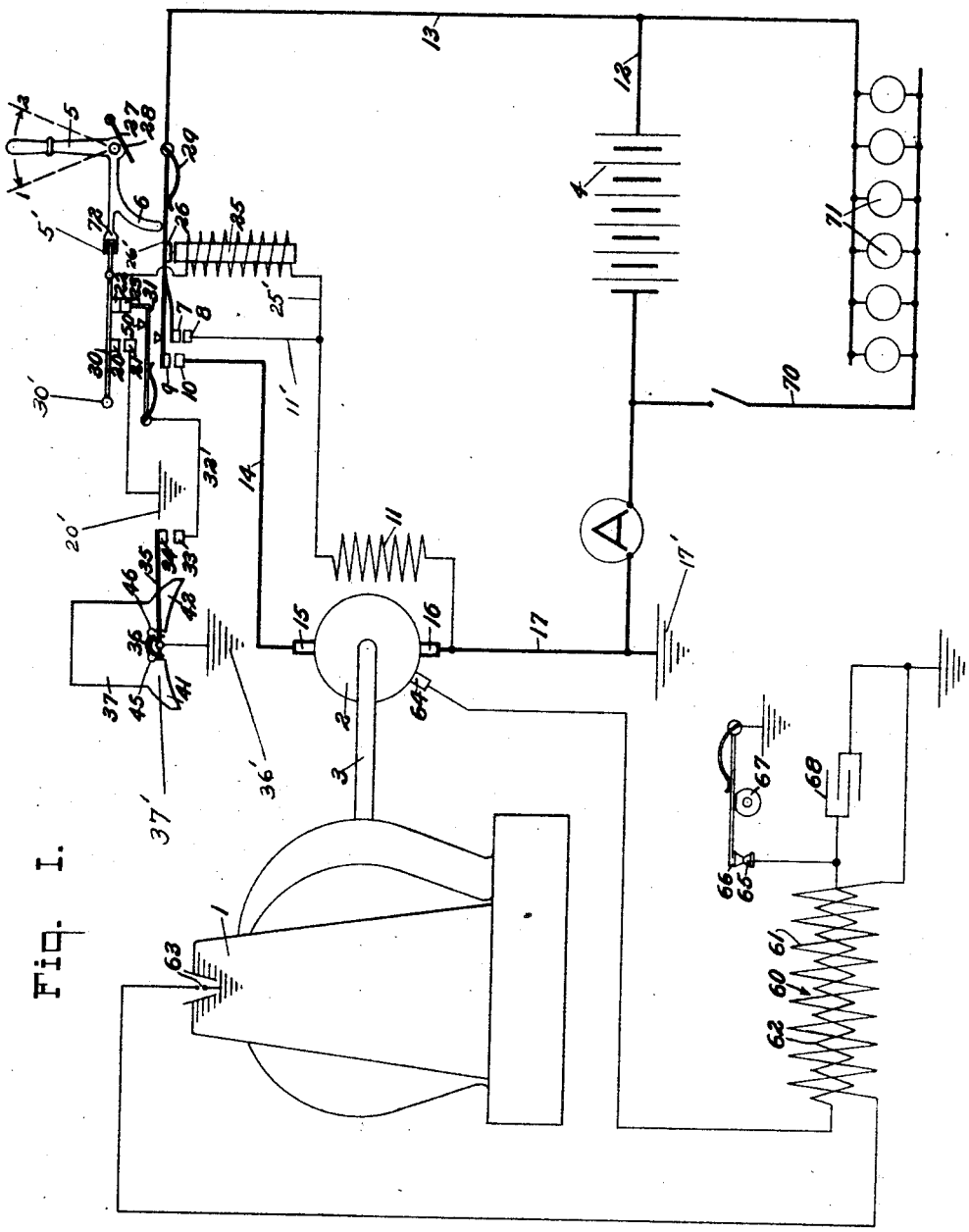
INVENTOR.
Carl P. Brockway.
BY Chester H Braselton
                    ATTORNEYS.

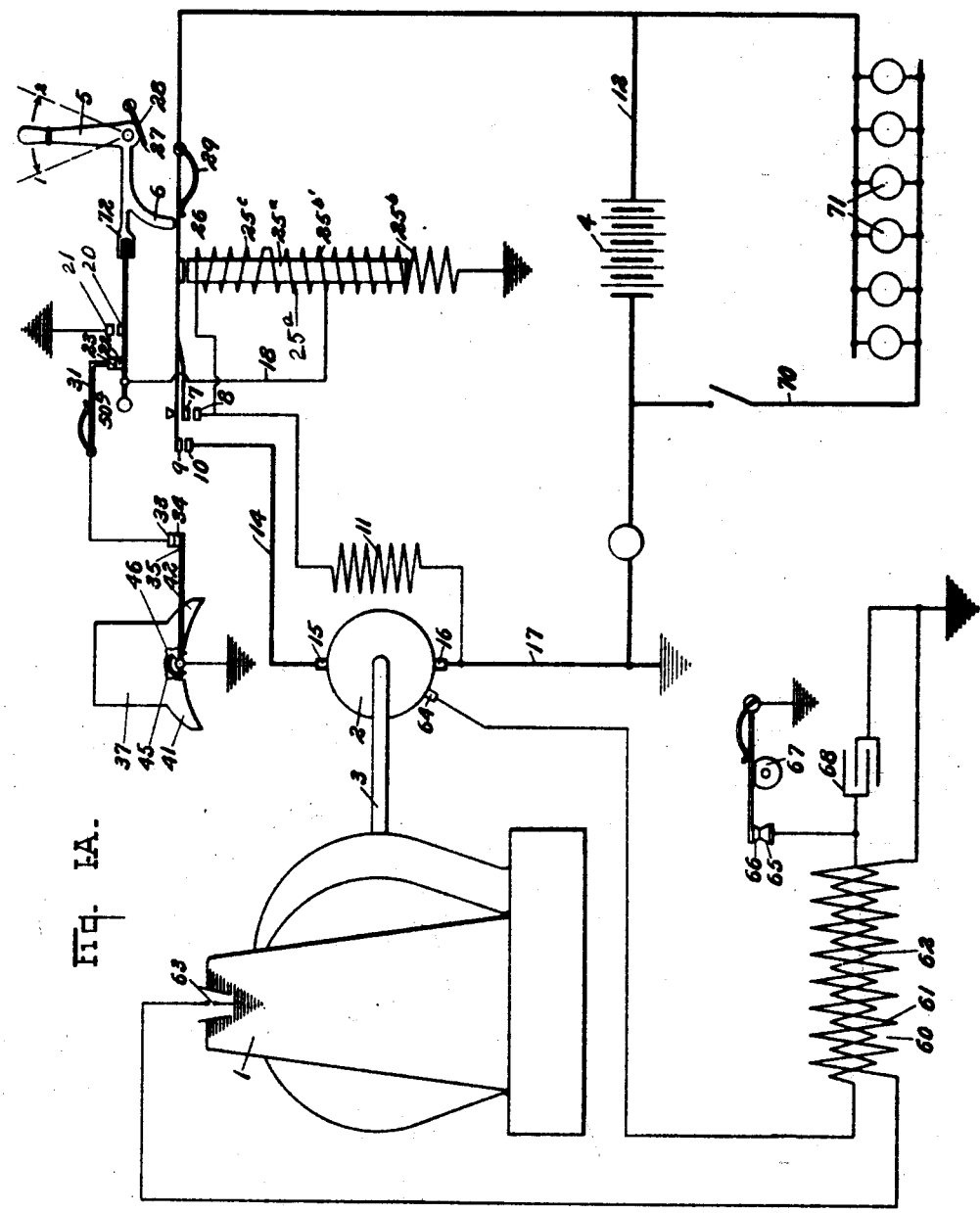

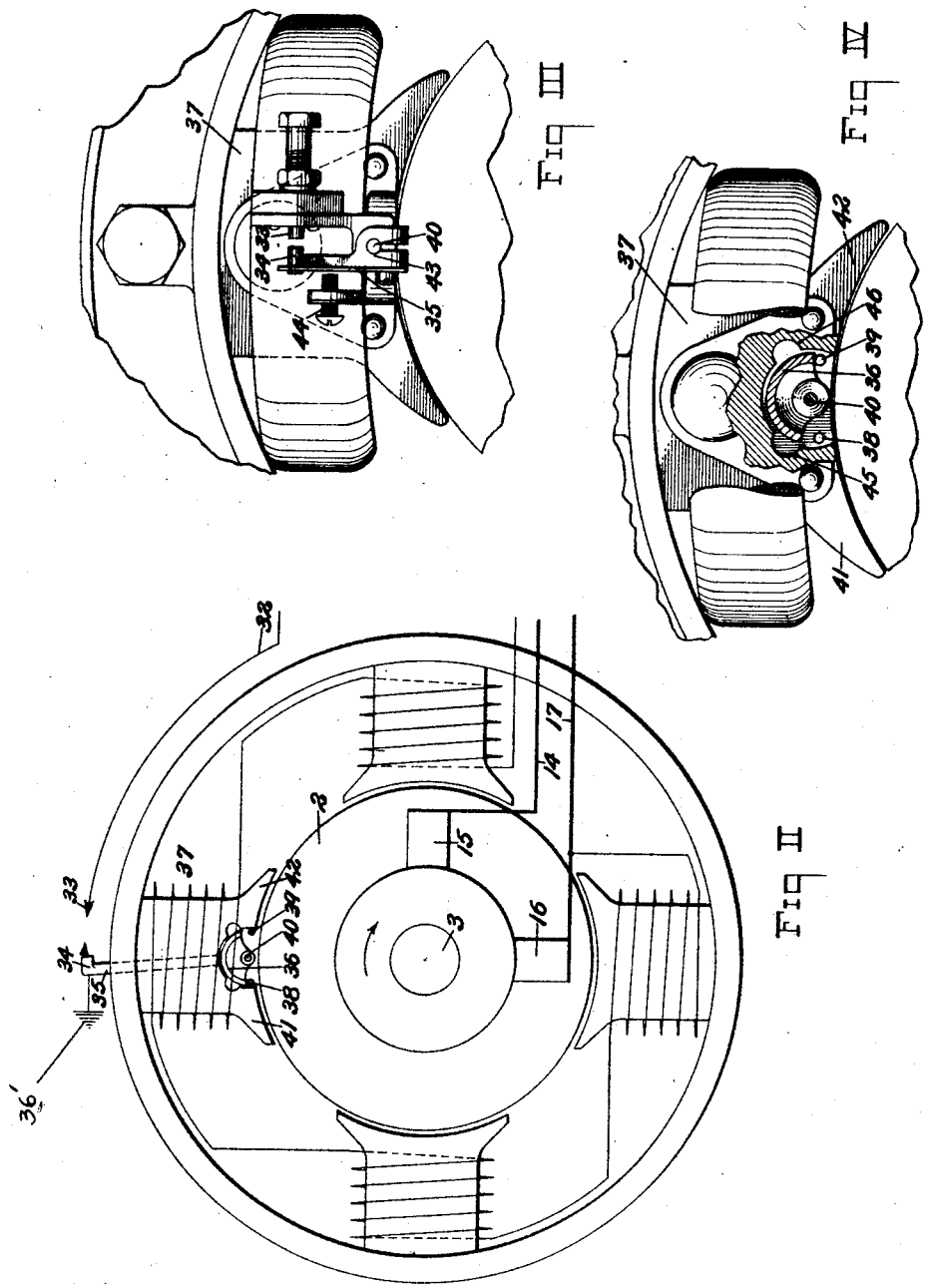

Feb. 19, 1929.　　　　　　　　　　　　　　　1,703,056
C. P. BROCKWAY
ELECTRIC POWER SYSTEM
Filed Jan. 6, 1921　　　11 Sheets-Sheet 4
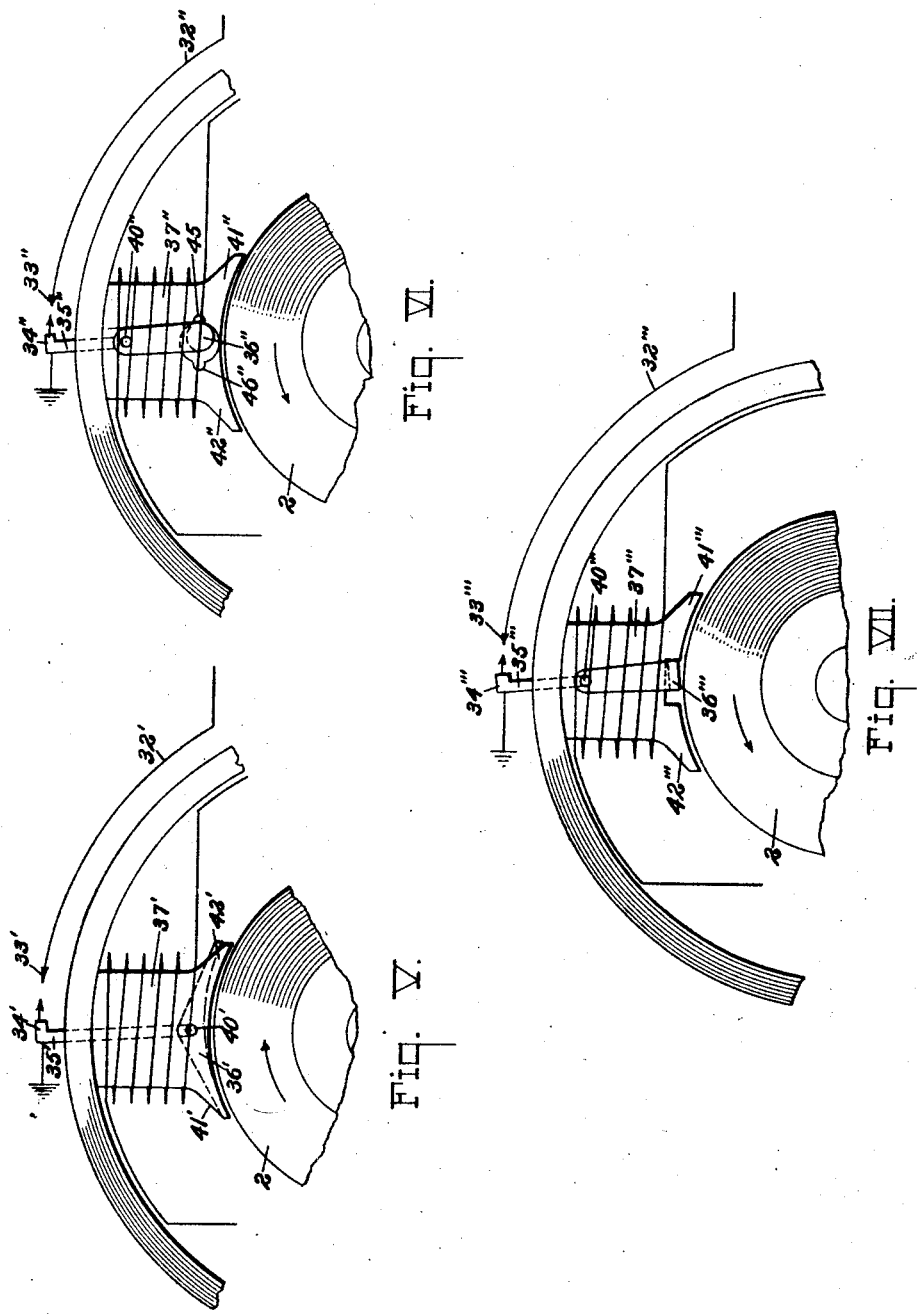
INVENTOR.
Carl P. Brockway.
BY
ATTORNEYS.

Feb. 19, 1929.
C. P. BROCKWAY
1,703,056
ELECTRIC POWER SYSTEM
Filed Jan. 6, 1921    11 Sheets-Sheet 5
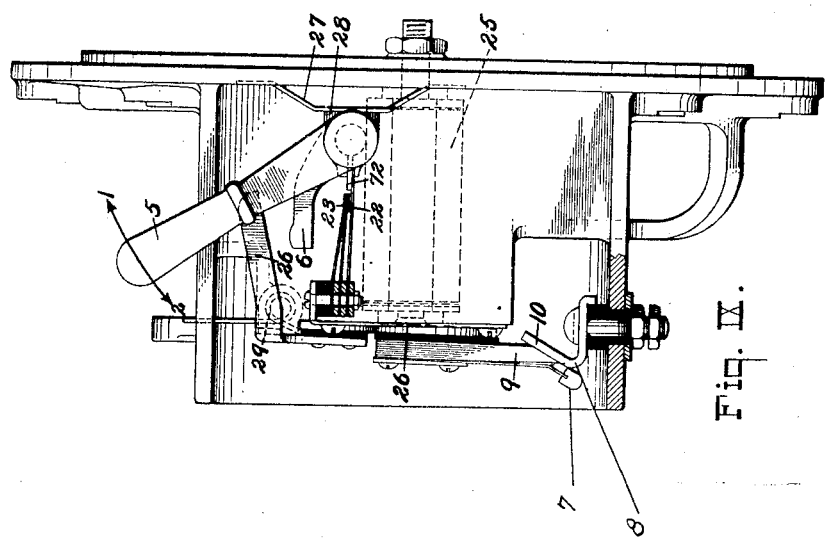
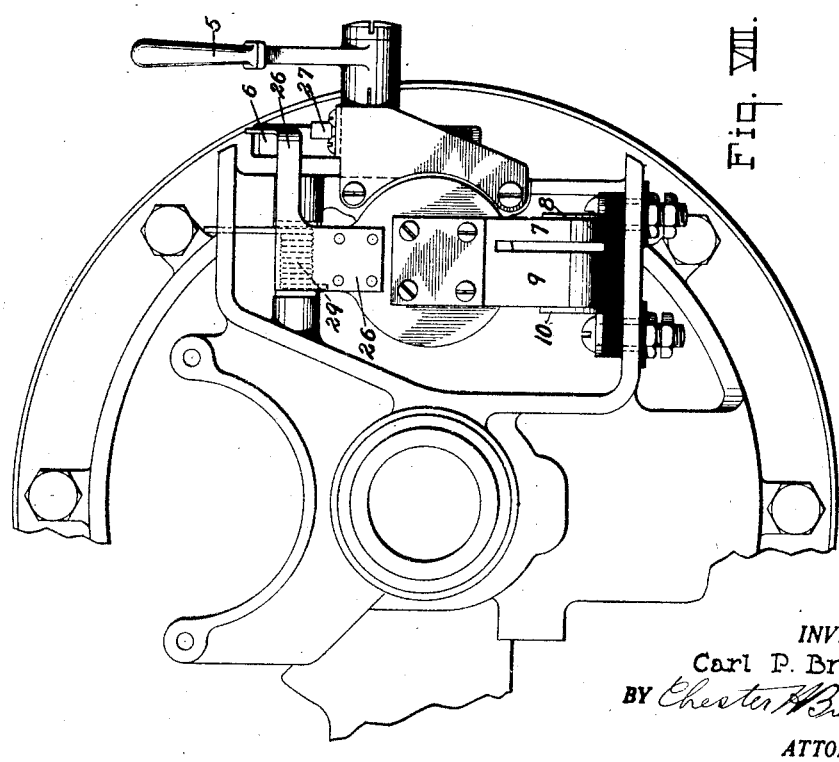
INVENTOR.
Carl P. Brockway
BY Chester H Braselton
ATTORNEYS.

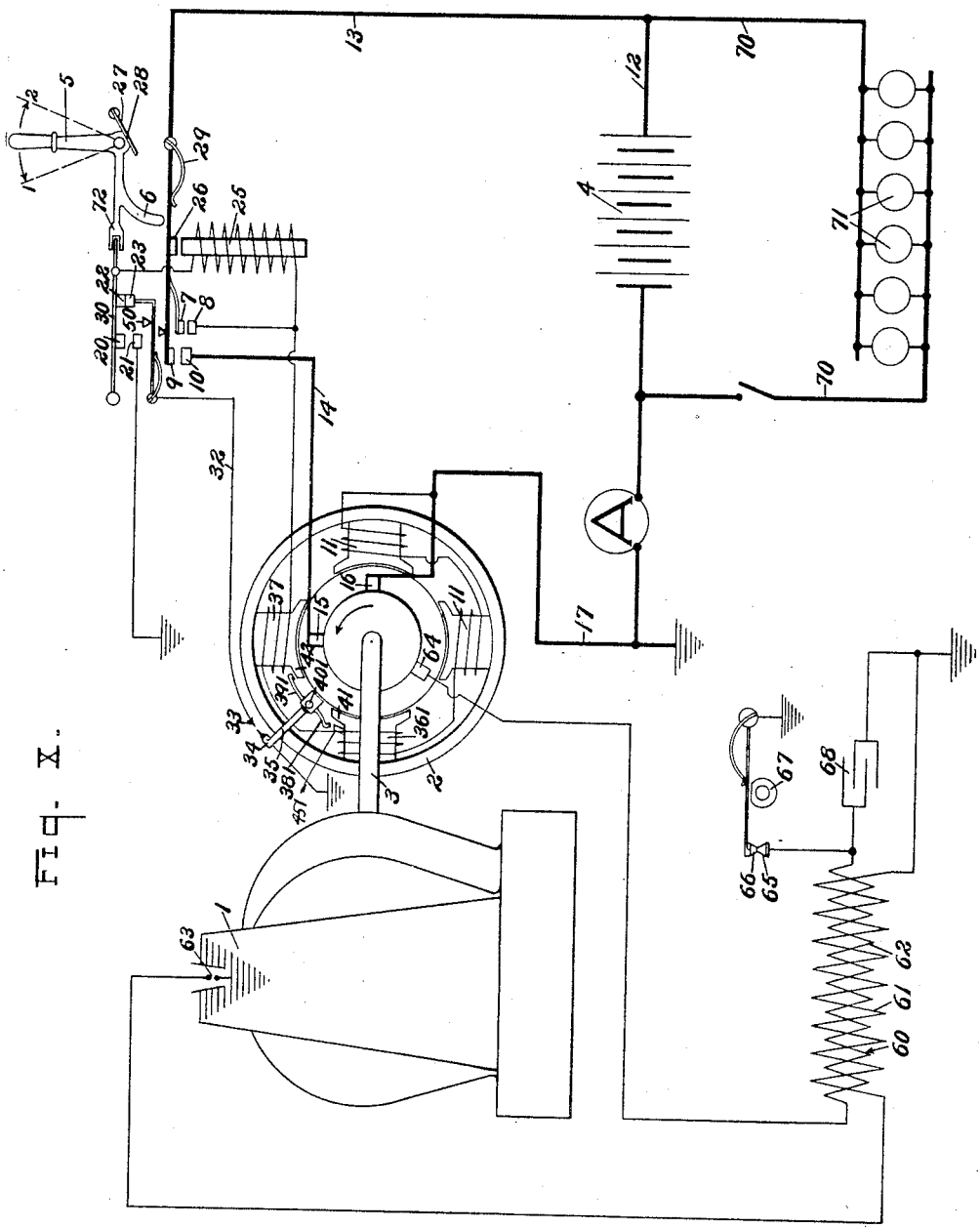

Feb. 19, 1929.
C. P. BROCKWAY
1,703,056
ELECTRIC POWER SYSTEM
Filed Jan. 6, 1921       11 Sheets-Sheet 7
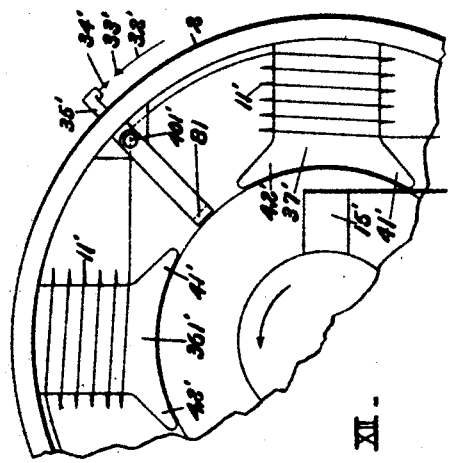
Fig. XI.
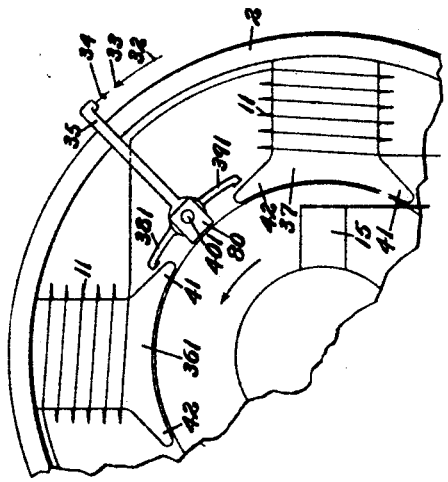
Fig. XII.
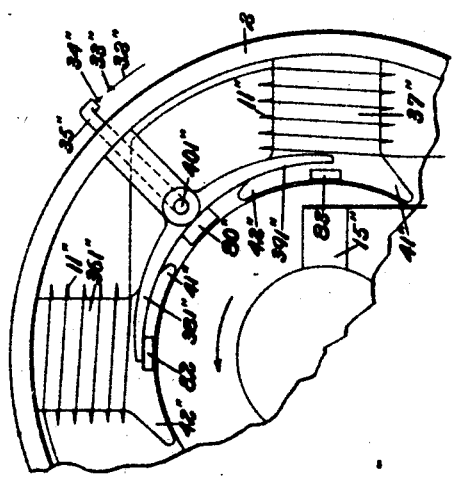
Fig. XIII.
INVENTOR.
Carl P. Brockway
BY Chester H. Braselton
ATTORNEY Feb. 19, 1929.
C. P. BROCKWAY
1,703,056
ELECTRIC POWER SYSTEM
Filed Jan. 6, 1921    11 Sheets-Sheet 8
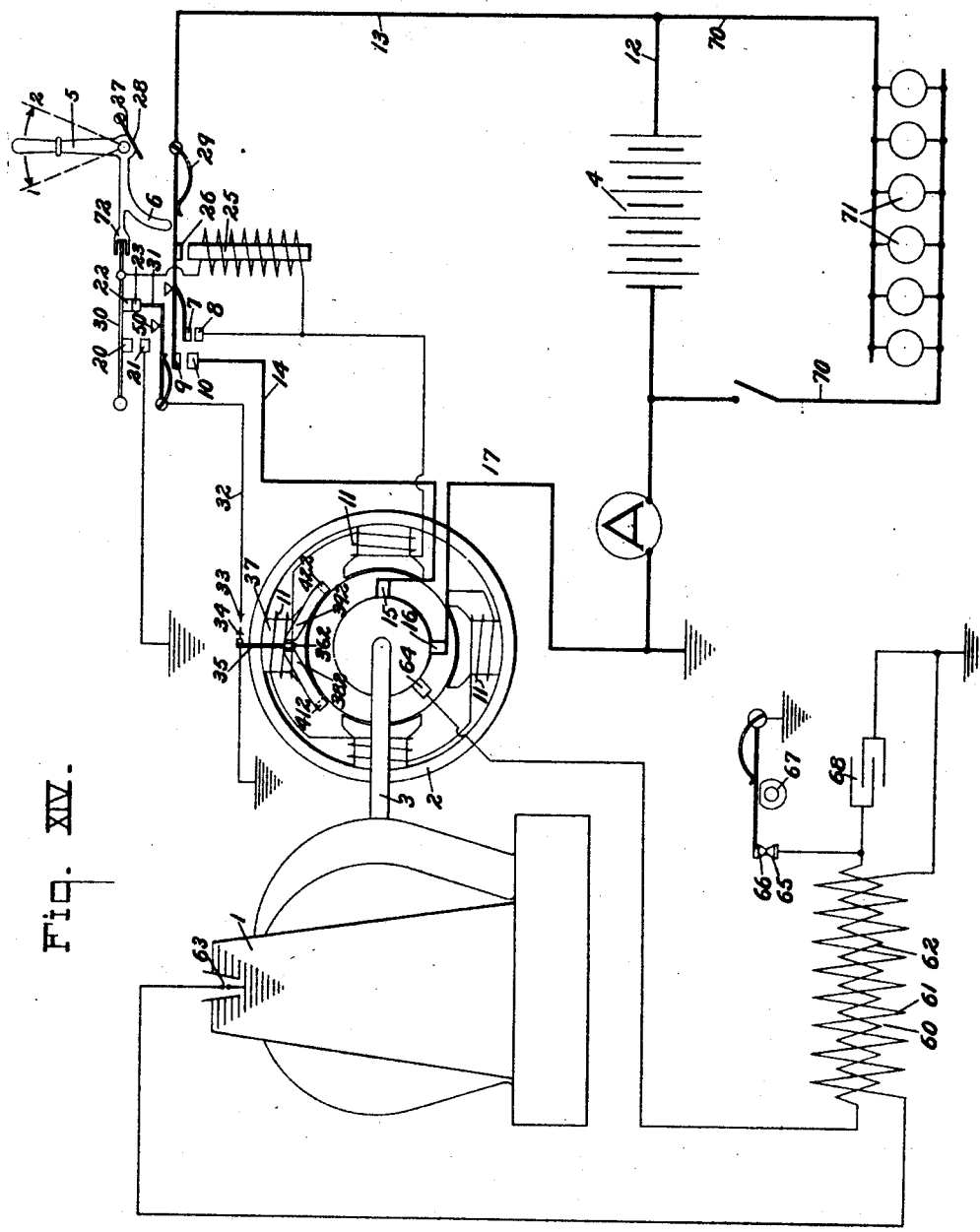
Fig. XIV.
INVENTOR.
Carl P. Brockway
BY Chester H Braselton
ATTORNEYS.

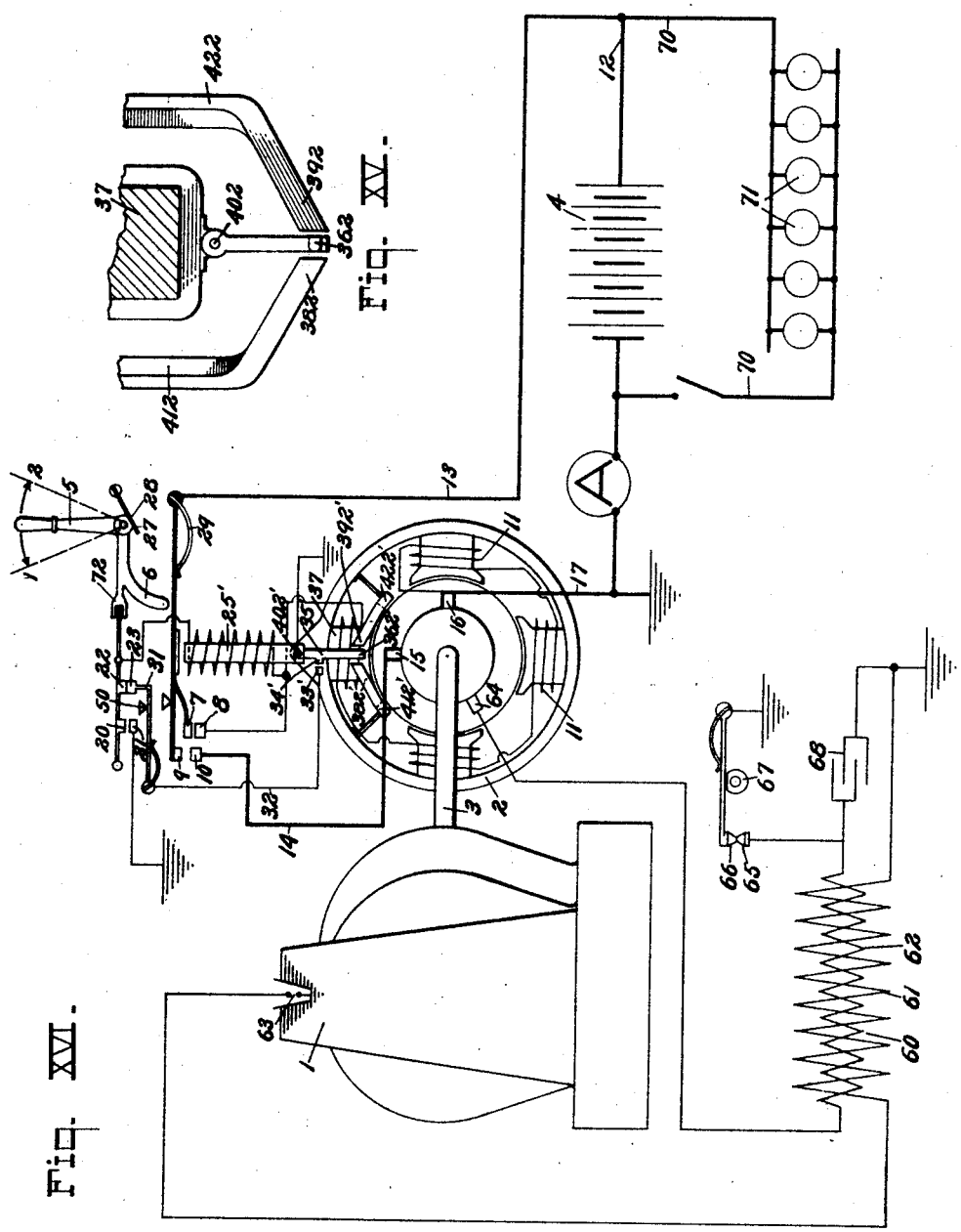

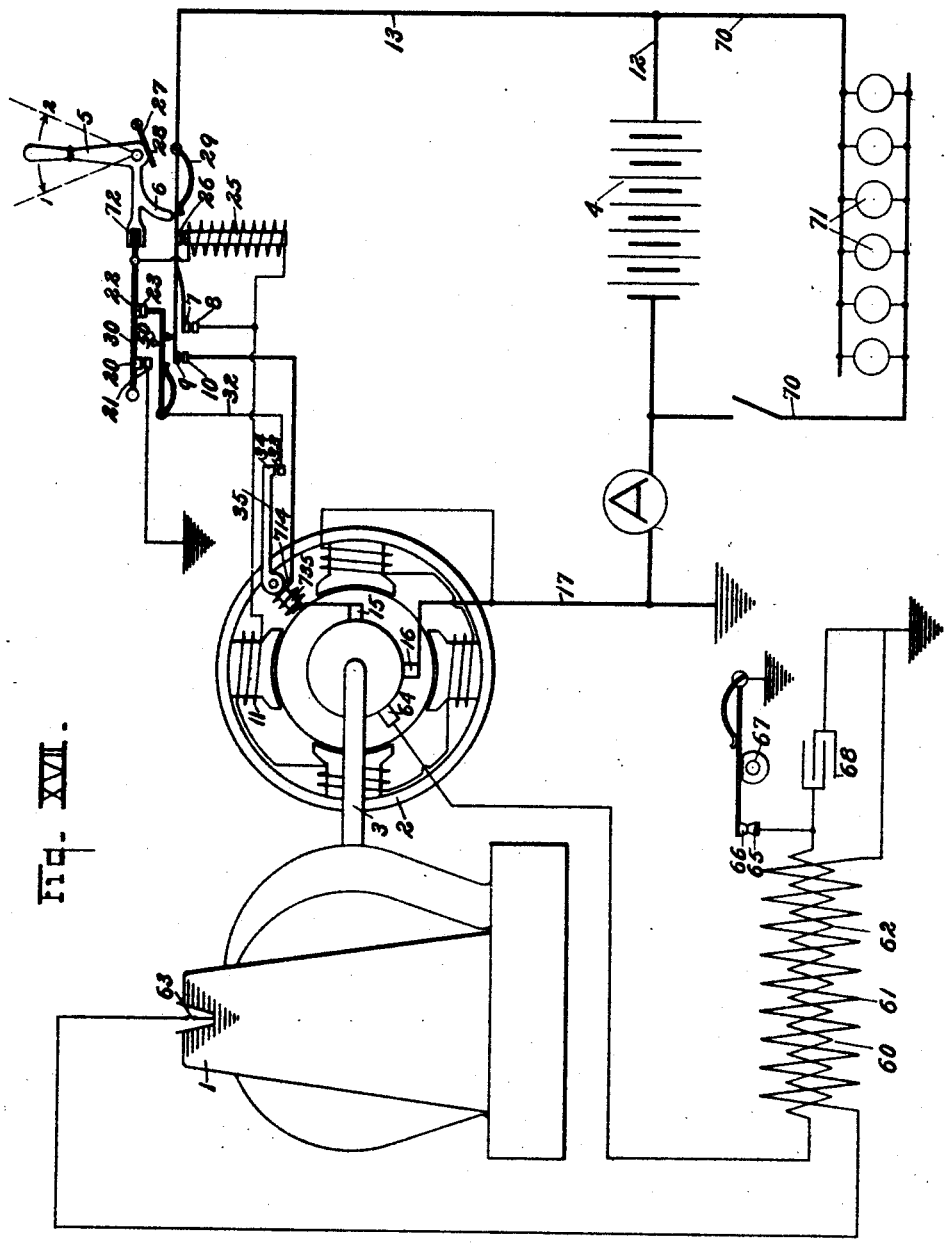

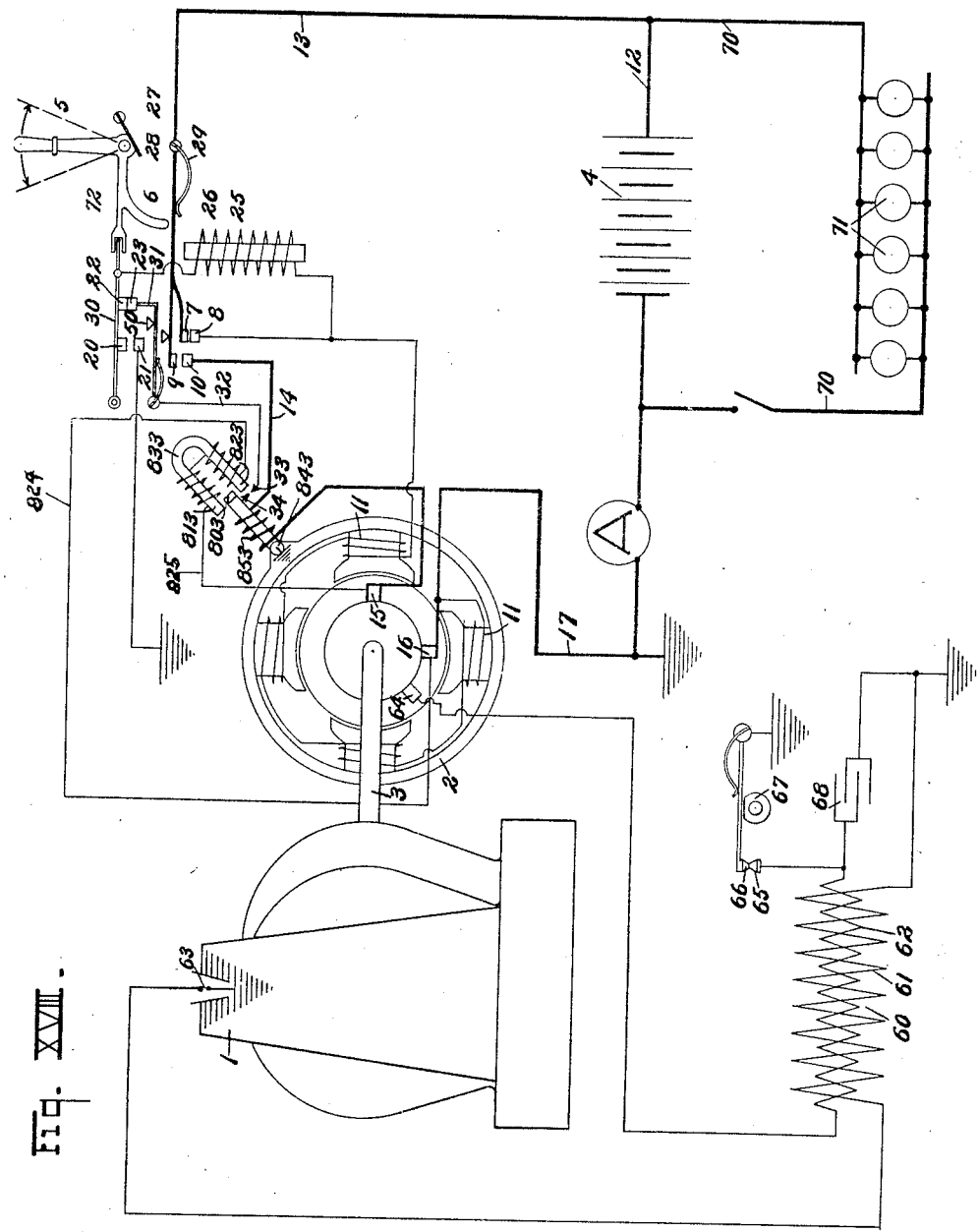

Patented Feb. 19, 1929.

1,703,056

UNITED STATES PATENT OFFICE.

CARL P. BROCKWAY, OF TOLEDO, OHIO, ASSIGNOR TO INDUSTRIAL RESEARCH CORPORATION, OF TOLEDO, OHIO, A CORPORATION OF DELAWARE.

ELECTRIC POWER SYSTEM.

Application filed January 6, 1921. Serial No. 435,381.

This invention relates to electrical circuit controlling means in a system or a power unit composed of a storage battery, an internal combustion engine, and a dynamo electric machine, having driving connection therewith for charging said battery and has for an object to provide a type of circuit controlling means whereby a circuit connection between the battery and dynamo electric machine may be closed manually for starting or automatically under certain running conditions, but is positively and automatically broken under all operating conditions and in contradistinction to the action of certain known types of circuit controlling means should the internal combustion engine fail to start or when, for example, the voltage of the dynamo electric machine falls below that of the battery or, in a certain embodiment of the present invention, when the dynamo electric machine ceases generating and begins to motorize. A type of said switch or circuit controlling means for carrying this into effect may consist of an arrangement having a movable member closely associated with a field pole of the dynamo electric machine, said movable member being actuated by the change in the distribution or density of the magnetic flux at a pole when the dynamo electric machine changes from action as a motor to action as a generator.

This invention comprehends any arrangement of the character above indicated adapted to utilize either the inherent functions of a dynamo electric machine for example, as a means whereby circuit connection between the battery and the dynamo electric machine is so actuated, or external means otherwise controlled by any suitable circuit or circuits.

Moreover, a particular object of the invention in this connection, is also to provide an arrangement of circuits in a power unit of the character indicated in which a generator battery circuit will be made or broken by a breaking or making of cooperating contacts in a circuit, in contradistinction to the making or breaking of said contacts and use may be made of a special electromagnetic coil for actuating said arrangement. A further object is to provide a switch having a movable member closely associated with two field poles of the dynamo electric machine, said movable member being actuated by the change in the distribution of the magnetic flux through the poles when the dynamo electric machine reverses its action.

A further object is to provide two magnetic members one placed on each side of a field pole of the dynamo electric machine so that the flux through said magnetic members changes direction when the dynamo electric machine reverses its action cooperating with means operated by said change of direction of flux to actuate an electric switch.

Another object is to provide an electric switch for the main circuit of a dynamo electric machine comprising a magnet of constant polarity, a second electromagnet which reverses its polarity when the dynamo electric machine reverses its action, and means to actuate the contact points of said switch by the relative movement between said magnets when the dynamo electric machine reverses its action.

The invention further contemplates an arrangement of the character specified wherein the action is augmented by the fact that the movable element which is actuated by the change of the distribution of magnetic flux in the dynamo electric machine is made also responsive to a reversal of flow of current in the main circuit for example, as by constituting said movable element an electromagnet energized by the current of the main circuit.

It is to be understood that an important phase of the invention resides in the provision of any suitable arrangement or means actuated by the change in the distribution of the magnetic flux in a dynamo electric machine to constitute an electrical switch or to constitute means for actuating a switch regardless of the system or combination in which said means per se is used.

Other objects and those relating to simplicity and compactness of structure and economies of manufacture will appear herein as I proceed with a detailed description of those particular embodiments of my invention which for the purposes of illustration I have shown in the appended drawings, in which Figure I is a diagrammatic view showing a wiring for the battery, engine, and dynamo electric machine and the operation of the various switches for one embodiment of certain of the phases of the invention.

Figure I^A is a diagrammatic view of modification of the general wiring system of Figure I.

Figure II is a view more or less diagrammatic, showing an arrangement of the armatures of a pole switch in greater detail.

Figure III is a detail outside view of a pole switch.

Figure IV is a similar view with parts cut away to show the pole switch armature.

Figures V, VI, and VII show modified forms of pole switch.

Figure VIII is a partial view of an end plate of a dynamo electric machine showing a suitable location of the switches.

Figure IX is a view taken at right angles to Figure VIII, but with parts cut away to show the inside structure of the switch mechanism.

Figure X is a diagrammatic view of a modification, while

Figures XI, XII, and XIII are fragmentary views of further modifications of the same general type.

Figure XIV is a similar diagrammatic view of a different embodiment of my invention.

Figure XV is an enlarged view of the pole arrangement of Figure XIV.

Figure XVI is a diagrammatic view of a modification of the embodiment of Figure XIV generally similar thereto.

Figure XVII is a diagrammatic view of a further embodiment of the invention wherein the movable switch element is also an electromagnet located in the main line circuit.

Figure XVIII is a diagrammatic view of a still further embodiment of certain principles of my invention where the circuit controlling means is external of the dynamo electric machine.

In the drawings similar reference characters refer to similar parts throughout the several views.

In Figure I of the drawings, 1 represents the engine which is connected to the dynamo electric machine 2 by the shaft 3 to charge a storage battery 4. The dynamo electric machine 2 in the embodiment particularly shown takes current from the storage battery 4 for cranking the engine for starting purposes although a separate starting motor could be used. The invention of Figure I provides means as stated, whereby when an engine begins to operate under its own power a generator such as one for charging a storage battery 4, is connected in circuit by the change in the distribution of magnetic flux in the field. Moreover, if the engine should stop for any reason while the dynamo electric machine 2 is charging the battery 4, the electric circuit is automatically broken as soon as the dynamo electric machine begins to act as a motor. Thus the battery is prevented from discharging.

In the particular arrangement of circuits disclosed in Figure I the dynamo electric machine 2 has a main armature circuit from the battery 4 through the wires 12, 13; switch lever 26'; wire 14; poles 15 and 16 and return wire 17 through an ammeter, if desired. The dynamo electric machine field is illustrated at 11 and an auxiliary circuit is provided for this field being tapped off switch 26' through contacts 7, 8 by lead 11' connecting with the return wire 17 as shown. The armature circuit between the dynamo electric machine and battery is provided with a main switch having contacts 9 and 10, contact 9 being on a movable switch arm 26' normally urged against a stop by a spring 29. This same switch arm 26' may carry the movable contact 7 of the field circuit switch referred to.

As stated the invention contemplates manual and automatic means for controlling the dynamo electric machine circuit and moreover, a particular type of circuit controlling means constitutes one phase of the invention. For manually operating the switch, the handle 5 is provided having a depending arm 6 adapted to engage the switch lever 26'. The end of the lever 5 may be flattened as at 27 to be engaged by a leaf spring 28, for example, to maintain a certain normal neutral position of the manual switch 5. In the particular embodiment shown in Figure I the automatic means for controlling the circuit includes a switch actuated by a change in the distribution of magnetic flux of a pole of the dynamo electric machine for controlling the solenoid which solenoid controls the main switch lever 26' and hence the contacts 9 and 10 as well as 7 and 8. The lead 17 may be grounded at 17', for example, and a lead wire 25' tapped off the lead 11' is wound to constitute the solenoid 25 and is connected with the pivoted lever 30 pivoted at 30'. This lever carries two sets of contacts 20, 21 and 22, 23, the set 20, 21 connecting the ground at 20' while the set 22, 23, the latter carried by lever 31 spring pressed as shown against stop 50 connects through wire 32 to the fixed contact 33, which is adapted to cooperate with the movable contact controlled by the pole switch. The movable contact of the pole switch is illustrated at 34 carried by a lever 35 adapted to be operated by the pivoted armature 36.

As shown in Figures I and II to IV a suitable construction of pole switch consists in providing the pole 37 with a curved recess 37' within which the rotating armature 36 is pivoted at 40. This recess divides the pole piece into two wings 41 and 42 as shown and for purposes of added efficiency, auxiliary recesses 45 and 46 may be provided to augment the attractive action of the change in magnetic flux in the separate wings. It will be noted that the armature 36 is grounded at 36'.

It will be noted that the manual switch 5 is connected by movable connection 5' to the lever 30 for a purpose as will hereinafter appear.

In Figures III, VIII and IX there is illustrated a specific construction of pole switch and manual switch and solenoid arrangement for satisfactorily accomplishing the results sought, the parts being correspondingly numbered with those illustrated diagrammatically in Figure I.

Thus, in Figure III the shaft 40 of the pole armature 36 extends out beyond the pole winding and has an arm 43 rigidly secured thereto by some suitable means such as a set screw or clamp as shown. This arm 43 is secured to and operates the flexible arm 35 which carries the movable contact 34. The flexible arm 35 allows the pole armature 36 to rotate after contact of points 33, 34 until it strikes stop 39. An adjustable stop 44 may limit the rotation in the opposite direction, the stop 38 being used as a safety stop to insure that the pole armature may never interfere with the armature of the dynamo electric machine. Details of a manual switch 5 and the other parts are shown in Figures VIII and IX only where the parts shown in Figure I will be found.

In Figure IX the contact points 22, 23 only are shown but the contacts 20, 21 are similarly formed and placed by the side of the spring contacts 22, 23 so that both sets may be opened by the lug 72, which is rigid with the handle 5, when handle 5 is moved to position 2. When handle 5 is in neutral position only points 22, 23 are closed as shown, while the points 20, 21 are held open by the lug 72.

The engine ignition for the spark plug 63 is obtained from the spark coil 60 which has the usual secondary winding 61 and the primary winding 62. The current for the primary 62 is obtained from a third brush 64 as shown in Figure I, and said primary circuit is interrupted by the breaker points 65, 66 operated by the cam 67 which is geared to the engine and properly timed therewith in the usual manner. A condenser 68 is connected across the breaker points 65, 66 in the usual manner as shown.

A load circuit 70 for the storage battery 4 may be connected as shown, and may consist of electric lamps, heaters, or any kind of translating devices 71. Of course this load circuit is supplied with current from the dynamo electric machine 2 when it is acting as a generator and charging the battery.

When the handle 5 is moved to position 1, the arm 6 which is rigid with the handle 5, depresses the contact points 7 and 9 to make electrical connection with the contacts 8 and 10. Contact is made through points 7, 8 to establish a current in the field windings 11 of the dynamo electric machine a short time before the contact of points 9, 10 permits the armature current to pass from the battery 4 through the wires 12, 13, lever 26', points 9, 10, wire 14, main brush 15, armature of the dynamo electric machine 2, main brush 16, and wire 17, back to the battery. The establishment of the field current in advance of the armature current when the dynamo electric machine is to be used as a motor creates a larger starting torque by first building the field, tends to prevent surge of current through the armature when the points 9 and 10 contact, energizes solenoid 25 (when contacts 20, 21 are closed), and as the contacts 7 and 8 open last when the switch is opened prevents arcing at the main contacts 9 and 10.

When handle 5 is moved to position 1 the contact points 20 and 21 are closed through the medium of the link mechanism shown, or by any suitable means, which therefore establishes a current through the electromagnet 25 from ground 17' battery 4, lead 13, lever 26', contacts 7, 8, lead 11', wire 25', solenoid 25, lever 30, contacts 20, 21, ground 20'. This in turn acts upon the armature 26 and holds the contact points 7 and 9 in contact with points 8 and 10 respectively and materially aids in manually closing the main switch. However, when handle 5 is released the spring 27 acting upon the flat surface 28 on the boss of the handle causes it to fly back to the neutral position as shown in Figure I. With handle 5 in neutral position contacts 20, 21 are open, therefore when handle 5 is released the main circuit through the dynamo electric machine 2 is broken by the action of spring 29 in moving upwardly the lever 26' and withdrawing armature 26, unless the circuit through the electromagnet 25 is closed by some other means. My invention contemplates such means for closing the circuit through the electromagnet 25 when the dynamo electric machine 2 is acting as a generator or when a separate generator starts but for opening the circuit when it is motorizing. This means consists of a second grounding circuit for element 30 which is in parallel with the ground circuit through points 20, 21 and which is controlled by the pole switch 35. This second ground circuit consists of the contact points 22, 23 which are closed for the neutral and first or starting position of handle 5, the yieldable member 31, wire 32, and the contact points 33, 34 which are closed by the operation of a pole armature 36 in the pole 37 of the dynamo electric machine 2 (shown diagrammatically in Figure I) when the dynamo electric machine is generating, and opened when the dynamo electric machine is motorizing. The direction of rotation of the dynamo electric machine 2 being as shown by arrow in Figure II when the dynamo electric machine 2 is motorizing, the magnetic flux passing from the pole 37 to the armature concentrates toward the side 41 of the pole tip and consequently pulls the pole armature 36 over against its stop 38. The arm 35 being fastened to the pole armature 36 therefore swings to the left (in Figure II) and separates contact points 33 and 34. When, however, the dynamo electric machine 2 acts as a generator the magnetic flux concentrates more toward the side 42 of the pole tip and consequently pulls the pole armature 36 over against its stop 39. This movement closes the contact points 33 and 34. Thus it is seen that the electromagnet 25 is energized even when handle 5 is in neutral position if the dynamo electric machine 2 is generating but immediately becomes positively de-energized when the dynamo electric machine 2 begins to act as a motor regardless of the amount of current flowing and consequently the main circuit is broken by separation of points 9, 10 and 7, 8. Therefore no harm can come to the dynamo electric machine or battery if something should go wrong with the engine and cause it to cease delivering power to the dynamo electric machine.

When it is desired at any time to stop the engine, the handle 5 is moved over to position 2. This separates the contact points 22 and 23 since the upward movement of point 23 is limited by a stop 50, or any other suitable means, and de-energizes the electromagnet 25. This will break both armature and field circuits at 9, 10 and 7, 8 and hence de-energize the ignition circuit thus stopping the engine.

In starting the engine the handle must be held in position 1 until the engine starts. If the engine does not start when it should and the handle 5 is released, it flies back to neutral position automatically under the influence of the spring 27 and since the engine has not started the pole switch contacts 33, 34 will be opened positively under all operating conditions in contradistinction to the possible action of known types of control thus opening the circuit which energizes the solenoid 25. The spring 29 will therefore actuate the lever 26' and open the main circuits at the contacts 9, 10 and 7, 8. This prevents discharge of the battery which might otherwise occur if the operator released the manual switch and the engine had not actually started. If the engine starts properly before the handle 5 is released then the pole switch has operated to close contacts 33, 34 thus energizing the solenoid 25 operating on armature 26 to hold the main circuits closed. It will thus be seen that the apparatus is protected against otherwise possible injury upon careless starting.

An especial feature of pole switch is the cutting away of the pole piece 37 as shown at 45 and 46 (see Figure IV). This narrows the sectional area through which the pole flux passes and creates a greater tendency for a part of the flux to pass through the pole armature 36 and thus cause the same to act with a greater force.

In Figure I^A there is shown an arrangement of circuits similar to that of Figure I but with the important difference that the generator battery circuit is made or broken by a breaking or making respectively of the auxiliary circuit which is controlled by the field flux switch operating mechanism, rather than by a making and breaking thereof. In other words, the circuit is reversely arranged compared with that of Figure I, with certain attendant advantages in that the action of opening the main charging or starting circuit will be positively effected. To accomplish a making of the generator battery circuit the electromagnet 25 is in effect short circuited thus causing the main battery charging circuit to be made upon an opening of contacts 34, 33 instead of upon a closing thereof. In order to prevent a dead short circuit of the battery 4 however, I have shown a novel type of electromagnet coil $25^a$ which is wound in one direction $25^b$ and oppositely wound for another portion $25^c$ of the coil. Tapped off the coil $25^a$ is the wire 18 connecting to ground through the contacts 22, 23, lever 31, and the contacts 33, 34 of the pole switch which is normally closed. The end of the coil $25^b$ is also grounded. It is important to note that wire 18 connects with winding $25^b$ on $25^a$ at a point sufficiently below the reversed winding $25^c$ that a balancing winding $25^{b\prime}$ equal to winding $25^c$ is in effect between battery 4 and wire 18.

Each set of contact points 33, 34; 20, 21; and 23, 22 are shown on the opposite sides of their controlling arm members respectively from the arrangement of Figure I so that where circuits are made in Figure I, the same are broken in Figure I^A.

The operation of this modified circuit arrangement and switch therefor is as follows: The engine 1 may be started as before by closing contacts 7 and 8 and 9 and 10 manually, contacts 20, 21 being thereby opened instead of closed as before, and arm 35 of the pole switch being normally in position to close contacts 33, 34. When the engine speeds up and the dynamo electric machine generates, contacts 33, 34 open (instead of close), thereby opening the short circuit 18 so that coil $25^a$ operates through an effective electromagnetic force due to the difference between the armature turns $25^b$ and $25^c$ to hold closed contacts 7, 8 and 9, 10. Thus the main charging circuit is kept closed as long as the generator potential exceeds that of the battery 4. Should the engine stop, or fail to start, the circuit is broken at 7, 8 and 9, 10 by reason of the short circuiting of section $25^b$ of the coil $25^a$, because of the action of the pole switch 35 in operating to close contacts 33, 34 which throws circuit 18 in connection with the electrical power source but at the same time sufficient resistance through reverse coil $25^c$ and an equal amount $25^{b\prime}$ of coil $25^b$ is thrown in to prevent any danger of dead short circuit of the battery. The action of sections $25^c$ and 25b′ of the coil balance each other and hence there is no tendency to operate solenoid 25a to close the main charging circuit. The engine can be stopped by hand as before and this also short circuits the solenoid 25a by closing circuit 18 through contacts 20, 21.

Figures V, VI, and VII show modifications 36′, 36″, and 36‴ of the pole armature and other correlated parts, any of which modifications may be substituted for the pole armature already described herein.

In Figure V, the pole armature 36′ rocks in a slot in the pole piece 37′. When the dynamotor 2 is motorizing, the flux is concentrated on the side 41′ of the pole tip. This depresses that end of the pole armature 36′ by causing it to fill up the air gap of the slot at that end, thus forming an easier path for the flux to pass, i. e. it cuts down the reluctance at the side 41′ and separates the point 34′ from contact with 33′. When the dynamotor is generating the flux is concentrated on the side 42′ and the points 33′, 34′ are closed by a like operation of 36′.

In Figure VI, the pole armature 36″ extends across the pole piece 37″ through a hole therein and is pivoted at 40″ as shown. Now with the direction of rotation as shown by the arrow, when the dynamo electric machine 2 motorizes, the pole armature 36″ is drawn over to the right, as shown, since this reduces the magnetic reluctance on the side 41″ where the flux is concentrated. Hence contact points 33″, 34″ are separated. When the dynamo electric machine 2 generates, the pole armature 36″ is drawn over to the opposite side for the same reason and therefore closes the points 33″, 34″. The cut away portions 45″ and 46″ are for the same purpose and act in the same manner as previously described herein for the portions 45 and 46 of Figures I and II.

Figure VII shows a modification very similar to Figure VI, with the exception that the pole armature 36‴ and the slot in which it rocks are shaped differently. The operation is the same as described for Figure VI and the description thereof in thought unnecessary.

Figures X and XI show a modification in which the pole armature is effected by the change of distribution of flux in two of the field poles as the dynamo electric machine changes its action. The pole armature 381, 391 is pivoted at 401. The direction of rotation being as shown by the arrow, when the dynamo electric machine is motoring the magnetic flux passing from the pole 361 to the armature concentrates toward the side 41 of the pole tips and consequently pulls the pole armature 381 over against its stop and allows flux to pass through 381 and the magnetic member 80. This movement opens points 33, 34 as in Figure I. In a similar way when the dynamo electric machine is generating the flux concentrates on tips 42 and draws down the arm 391 of the pole armature, thus closing points 33, 34. In order to avoid distorting magnetic influences of the pole tip 41 the arm 381 may be formed to contact with a projection 451 on the side face of the pole piece as illustrated in Figure X. The wiring system and other electrical features are as described for Figure I.

Figures XII and XIII show other modifications closely resembling that of Figures X and XI. In Figure XII the pole armature 81 is pivoted on the axis 401′ and normally takes a position between the tips 41′ and 42′ as shown. When, however, the dynamo electric machine is generating the flux concentrated at the tip 41′ draws the pole armature 81 toward tip 41′ since such movement will give a greater iron path for the flux and the arm 35′, being rigidly fastened to the rocking member, closes contact points 33′, 34′. When the dynamo electric machine motorizes the pole armature 81 is drawn over toward tip 42′ thus breaking contact between points 33′, 34′.

The modification of Figure XIII differs from that of Figure XI in that the rocker members 381″, 391″ are positioned not directly between the poles but at the side thereof, and the end of arm 381″ is at all times close to pole 361″ while the end of arm 391″ is at all times close to pole 37″.

Now when the dynamo electric machine is generating the flux concentrated at the tips 42″ passes through arm 391″ and out at 80″, thus causing arm 391″ to be drawn down against stop 83 and closing points 33″, 34″. When the dynamo electric machine motorizes flux is concentrated at the tips 41″ which causes flux to pass from pole 361″ through arm 381″ thus rocking arm 381″ against stop 82 and opening contact points 33″, 34″.

Figures XIV and XV show a modification wherein two magnetic members 412 and 422 are placed on each side of a field pole 37 of the dynamo electric machine so that the flux through said magnetic members changes direction when the dynamo electric machine changes its action, and wherein the magnet 362 of constant polarity is placed in the gap between the ends 382 and 392 of the magnetic members 412 and 422. The magnet 362 being pivoted upon pole 37 at 402 is of constant polarity since the polarity of pole 37 does not reverse. The members 412 and 422 are placed in close proximity to the revolving armature as shown so that they have a flux induced therein in one direction when the dynamo electric machine is motorizing and in the opposite direction when it is generating, due to the change in direction of the current in the dynamo electric machine armature. This induced magnetic flux flows from one of these members 412, 422 to the other through their ends 382, 392, likewise passing through the magnet 362. Since 362 is of constant polarity it will be drawn over against the stop 392 thereby closing the points 33, 34 when the dynamo electric machine is generating, and against stop 382, thereby breaking contact points 33, 34 when the dynamo electric machine is motorizing. The wiring of Figure I is employed in this modification.

The modification shown in Figure XVI is similar to that of Figures XIV and XV with the exception that the constant polarity magnet 362' receives its magnetism primarily from the electromagnet 25' instead of from a field pole as in Figures XIV and XV, this arrangement tending toward positiveness of operation and economy of parts. The operation is similar to that described relative to Figure XIV.

Figure XVII shows a modification in which the pivoted element 735 influenced by the flux action as previously described, is itself an electromagnet so arranged as to have its polarity also reversed when the current between the battery and dynamo electric machine reverses. The action is thereby the more positive and if by chance, in starting for example, the action of the flux change should for some reason fail, the reversal of current flow would in certain instances actuate the switch. In Figure XVII it will be seen that the main line circuit 14 deviates into an electromagnet 714 around the pivoted contact member 735. The arrangement may otherwise follow that of Figure I.

Figure XVIII shows a modification wherein an electromagnet 803 is pivoted at the stationary pivot 843 and has its winding 853 in series with the main circuit of the dynamo electric machine 2. The movable end 803 swings between two poles 813 and 823 of a stationary electromagnet 833 connected by leads 824 and 825 across the main brushes of the dynamo electric machine. The poles 813, 823 are of constant polarity since the windings of 833 are in a shunt circuit. The direction of winding of coil 853 is such that pole 803 is attracted to pole 823 closing points 33, 34 when the dynamo electric machine is generating, but is attracted to the pole 813 to open contacts 33, 34 when the dynamo electric machine begins to motorize. Further description is thought unnecessary since the operation is similar to that of the system shown in Figure I. This arrangement is particularly desirable where the dynamo electric machine is more or less inaccessible as the controlling devices may be placed at points of convenience. Aside from the features above noted this modification includes the essential elements and follows the same cycle of operation as the system disclosed in Figure I.

While I have described in more or less detail certain embodiments of my invention I do not wish to be limited thereto and therefore claim my invention broadly as well as specifically as indicated by the appended claims.

What I claim is:

1. In combination with an internal combustion engine and a dynamo electric machine having field poles connected thereto, an electric battery connected to said dynamo electric machine by an electric circuit, means for closing said circuit to cause the dynamo electric machine to start said engine, and means to automatically hold said circuit closed, said second means being actuated by the change of magnetic flux in the field poles of said dynamo electric machine when the engine starts.

2. In combination with an internal combustion engine and a dynamo electric machine having field poles connected thereto, an electric battery connected to said dynamo electric machine by an electric circuit, means for closing said circuit to cause the dynamo electric machine to start said engine and means for automatically holding said circuit closed and opening said circuit dependent upon the dynamo electric machine acting as a generator or a motor, said second means being actuated by the change in position of the flux through a field pole of the dynamo electric machine.

3. In combination with an internal combustion engine and a dynamo electric machine having field poles connected thereto, an electric battery connected to said dynamo electric machine by an electric circuit, and means for automatically closing and maintaining said circuit closed after the dynamo electric machine begins to act as a generator, said second means being actuated by the change in position of the flux through a dynamo electric machine field pole.

4. In combination with an internal combustion engine and a dynamo electric machine having driving connection thereto, a battery connected to said dynamo electric machine by an electric circuit, means for closing said circuit to cause the dynamo electric machine to start the engine, and electromagnetic means to hold said circuit closed only so long as the dynamo electric machine is generating and control means operable by flow of magnetic flux in said dynamo electric machine for modifying the action of said electromagnetic means.

5. In combination with an internal combustion engine and a dynamo electric machine having field poles in driving connection thereto, a battery connected to said dynamo electric machine by an electric circuit, means for closing said circuit to cause the dynamo electric machine to start the engine, and electro-magnetic means to hold said circuit closed only so long as the dynamo-electric machine is generating, said magnetic means being deenergized by the change in distribution of the flux through one of said field poles of the dynamo-electric machine.

6. In combination with a dynamo electric machine having a field pole, a movable member closely associated with said field pole adapted to effect the opening and maintenance of closure of a circuit from said dynamo electric machine said movable member being actuated by the change in distribution of flux through said field pole when the dynamo electric machine changes from motorizing to generating and vice versa.

7. In combination with a dynamo electric machine having a field pole, an electric switch, a movable member extending within a cut away portion in said pole and adapted to open and maintain closed said switch, said movable member being actuated by the change in distribution of flux through said pole when the dynamo electric machine changes from motorizing to generating and vice versa.

8. In combination with a dynamo electric machine having a field pole, an electric switch, a movable member pivoted on an axis extending crosswise of said pole, and adapted to open and maintain closed said switch, said movable member being actuated by the change in distribution of flux through said pole when the dynamo electric machine changes from motorizing to generating and vice versa.

9. In combination with a dynamo electric machine having a field pole, an electric switch, a movable member substantially of the form of a sector of a cylinder and pivoted at its center on an axis extending crosswise of said pole and adapted to open and maintain closed said switch, said movable member being actuated by the change in distribution of flux through said pole when the dynamo electric machine changes from motorizing to generating and vice versa.

10. In combination with an internal combustion engine, a dynamo electric machine connected thereto, an electric battery connected to said dynamo electric machine by an electric circuit, manual means for closing said circuit to cause the dynamo electric machine to start said engine and automatic means controlled by flux change in said machine to open said circuit said means being positively operative to maintain said circuit open unless said dynamo electric machine is acting as a generator to charge said storage battery.

11. In combination with a dynamo electric machine having a field pole, a movable member closely associated with said field pole adapted to effect the opening of a circuit from said dynamo electric machine said movable member being actuated by the change in distribution of flux through said field pole when the dynamo electric machine changes from motorizing to generating and vice versa.

12. In combination with a dynamo electric machine having a field pole, an electric switch, a movable member extending within a cut away portion in said pole and adapted to open said switch, said movable member being actuated by the change in distribution of flux through said pole when the dynamo electric machine changes from motorizing to generating and vice versa.

13. In combination with a dynamo electric machine having a field pole, an electric switch, a movable member pivoted on an axis extending crosswise of said pole, and adapted to open said switch, said movable member being actuated by the change in distribution of flux through said pole when the dynamo electric machine changes from motorizing to generating and vice versa.

14. In combination with a dynamo electric machine having a field pole, an electric switch, a movable member substantially of the form of a sector of a cylinder, and pivoted at its center on an axis extending crosswise of said pole and adapted to open said switch, said movable member being actuated by the change in distribution of flux through said pole when the dynamo electric machine changes from motorizing to generating and vice versa.

15. In combination with an internal combustion engine, a dynamo electric machine having field poles connected thereto, an electric battery, an electric circuit between the battery and dynamo electric machine, means for closing the circuit for causing the dynamo electric machine to start the engine, and control mechanism for said circuit closing means, said mechanism being dependent for operation upon the distribution of magnetic flux in the poles of the dynamo electric machine.

16. In a system of the class described, the combination of an internal combustion engine, a dynamo electric machine having field poles connected with the engine, a storage battery, a primary circuit connecting said battery and dynamo electric machine, a primary switch in the circuit, manual means for closing said switch, automatic means for holding said switch closed only when the dynamo electric machine is generating current, said automatic means comprising an electro magnet positioned adjacent the primary switch and a second switch positioned adjacent the dynamo electric machine, said second switch being operated by the magnetic flux in the field poles of the dynamo electric machine.

17. In combination with an internal combustion engine, a dynamo electric machine connected thereto, and electric battery, an electric circuit between the battery and dynamo electric machine, a switch for closing said circuit to start the engine, means for operating said switch, and additional means for controlling said switch operating means, said additional means being dependent for operation on the distribution of magnetic flux in said dynamo electric machine.

18. In combination with an internal combustion engine, a dynamo electric machine connected thereto, an electric battery, a primary electric circuit between the battery and dynamo electric machine, a secondary electric circuit connected in parallel with said primary circuit, a switch in said main circuit, control means in the secondary circuit operative to prevent opening of the primary circuit switch while said dynamo electric machine is generating current, a field coil in the secondary circuit, and a switch in said secondary circuit adapted to be opened after the primary switch is opened whereby inductive discharge at the break of the main switch is diminished.

19. In combination with an internal combustion engine, a dynamo electric machine connected thereto, an electric battery, a primary electric circuit between the battery and dynamo electric machine, a secondary electric circuit connected in parallel with said primary circuit, a switch in said main circuit, control means in the secondary circuit operative to prevent opening of the primary circuit switch while said dynamo electric machine is generating current, a field coil in the secondary circuit, a switch in said secondary circuit adapted to be opened after the primary switch is opened whereby inductive discharge at the break of the main switch is diminished, and single manual means for closing said switches.

20. In combination with an internal combustion engine, a dynamo electric machine connected thereto, an electric battery, a primary electric circuit between the battery and dynamo electric machine, a secondary electric circuit connected in parallel with said primary circuit, a switch in said main circuit, control means in the secondary circuit operative to prevent opening of the primary circuit switch while said dynamo electric machine is generating current, a field coil in the secondary circuit, a switch in said secondary circuit interconnected with said primary switch, and manual means for closing said secondary switch before the primary switch whereby the field coil of the dynamo electric machine is energized prior to the energization of the machine armature.

21. In a control system for dynamo electric machines, the combination of a field pole, an armature mounted and movable within said pole, and a switch arm mounted on said armature and movable in accordance with the distribution of flux in the pole and armature.

22. In a control system for dynamo electric machines, the combination of a field pole, an armature incorporated within said pole and pivotally and eccentrically mounted therein, and a switch arm mounted on said armature and movable in accordance with the distribution of flux in the pole.

23. In a controlled system of electric circuits, a dynamo-electric machine; a load circuit connected to said dynamo-electric machine; separable contacts in said load circuit; an electric magnet positioned in operative relationship to said contacts; a movable armature adjacent said electric magnet, said armature carrying one of said contacts adapted to move the same into close position with the other contact; two parallel circuits connected in series with said electromagnet; separable contacts formed in one of said parallel circuits adapted to be opened and closed by said dynamo-electric machine; separable contacts in the other of said parallel circuits; and means attached to one of said last named separable contacts adapted to engage said magnet armature when moved in one direction.

In testimony whereof, I affix my signature.

CARL P. BROCKWAY.